(12) United States Patent
Sipolins et al.

(10) Patent No.: US 10,725,540 B2
(45) Date of Patent: Jul. 28, 2020

(54) AUGMENTED REALITY SPEED READING

(71) Applicant: International Business Machines Corporation, Armonk, NY (US)

(72) Inventors: Aldis Sipolins, New York, NY (US); Jenna Reinen, Greenwich, CT (US); Ravi Tejwani, White Plains, NY (US); Marco Cavallo, New York, NY (US); Hui Wu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 16/023,427

(22) Filed: Jun. 29, 2018

(65) Prior Publication Data

US 2020/0004326 A1    Jan. 2, 2020

(51) Int. Cl.
| | | |
|---|---|---|
| *G06F 3/01* | (2006.01) | |
| *G06K 9/00* | (2006.01) | |
| *G06T 7/246* | (2017.01) | |
| *G06T 11/00* | (2006.01) | |
| *G06T 7/90* | (2017.01) | |
| *G06T 19/00* | (2011.01) | |

(52) U.S. Cl.
CPC ......... *G06F 3/013* (2013.01); *G06K 9/00604* (2013.01); *G06T 7/248* (2017.01); *G06T 7/90* (2017.01); *G06T 11/001* (2013.01); *G06T 19/006* (2013.01); *G06T 2207/10048* (2013.01)

(58) Field of Classification Search
CPC . G06F 3/013; G06T 7/90; G06T 7/248; G06T 11/001; G06T 19/006; G06T 2207/10048; G06K 9/00604

USPC ........................................................ 345/156
See application file for complete search history.

(56) References Cited

U.S. PATENT DOCUMENTS

| | | | |
|---|---|---|---|
| 2004/0100567 A1* | 5/2004 | Miller ................ | G02B 27/0093 348/239 |
| 2004/0252277 A1 | 12/2004 | Chmielewski, Jr. et al. | |
| 2014/0016867 A1 | 1/2014 | Maurer et al. | |

(Continued)

OTHER PUBLICATIONS

Simone Benedetto et al, "Rapid serial visual presentation in reading: The case of Spritz", Computers in Human Behavior. Apr. 2015. pp. 1-25.

(Continued)

*Primary Examiner* — Amare Mengistu
*Assistant Examiner* — Gloryvid Figueroa-Gibson
(74) *Attorney, Agent, or Firm* — Kristofer Haggerty; Otterstedt, Wallace & Kammer, LLP

(57) ABSTRACT

Augmented reality speed reading is provided by detecting a reader's changing gaze direction; detecting movements of the reader's eye; and between movements of the reader's eye, displaying text at the reader's gaze direction. An exemplary apparatus includes an eye illuminator that delivers light to a reader's eye; an eyeward camera that generates digital images of the reader's eye including reflected light from the eye illuminator; a display; and a processor that is connected in communication with the eyeward camera and the display. The processor implements an eye tracking module that receives the digital images from the eyeward camera and detects the reader's gaze direction, and the processor implements a text display module that controls the display to present text at the reader's gaze direction.

20 Claims, 4 Drawing Sheets

(56) References Cited

U.S. PATENT DOCUMENTS

2014/0253579 A1* 9/2014 Babaguchi ............. G02B 27/01
  345/590
2014/0361971 A1* 12/2014 Sala ........................ G06F 3/041
  345/156

OTHER PUBLICATIONS

F. Behrens et al, "An improved algorithm for automatic detection of saccades in eye movement data and for calculating saccade parameters" Behav Res Methods. Aug. 2010. pp. 701-708.

Kleinman, "Augmented Reality Glasses: What You Can Buy Now (or Soon)", Tom's Guide. Feb. 2018. pp. 1-5. available at https://www.tomsguide.com/us/best-ar-glasses,review-2804.html.

Mark Lambert, "Head-up over the hills: Flying the Hunter Mk 12 with head-up display", Flight International. Oct. 1964. p. 709-713.

* cited by examiner

AUGMENTED REALITY SPEED READING

BACKGROUND

The present invention relates to the electrical, electronic, and computer arts, and more specifically, to augmented reality devices and methods.

Augmented reality devices, such as goggles, glasses, or headsets, present a view of the real world overlaid with simulacra such as objects, text, or icons. One well known augmented reality device is the heads up display (HUD) or tactical display that is provided to pilots in military aircraft. Such a display was first developed in the mid-1950s.

Rapid serial visual presentation (RSVP) is a method of rapidly displaying written words at a fixed location. RSVP enables a reader to read words more quickly than is possible when the words are distributed spatially as on a conventional page or screen. When a reader's eyes move or saccade across a page or screen to focus on words that are distributed in space, the reader is not able to perceive visual stimuli during the saccade intervals. RSVP eliminates saccades by displaying the words at the fixed location, thereby enabling the reader to continually perceive the rapidly changing sequence of words and to read at a higher number of words per minute than is possible with a normal display.

SUMMARY

Principles of the invention provide techniques for augmented reality speed reading. In one aspect, an exemplary method includes detecting a reader's changing gaze direction; detecting movements of the reader's eye; and between movements of the reader's eye, displaying text at the reader's gaze direction.

In another aspect, an exemplary apparatus includes an eye illuminator that delivers light to a reader's eye; an eyeward camera that generates digital images of the reader's eye including reflected light from the eye illuminator; a display; and a processor that is connected in communication with the eyeward camera and the display. The processor implements an eye tracking module that receives the digital images from the eyeward camera and detects the reader's gaze direction, and the processor implements a text display module that controls the display to present text at the reader's gaze direction.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer readable storage medium (or multiple such media) and implemented on a hardware processor, or (iii) a combination of (i) and (ii); any of (i)-(iii) implement the specific techniques set forth herein.

In view of the foregoing, techniques of the present invention can provide substantial beneficial technical effects. For example, one or more embodiments provide one or more of:

Rapid apprehension of textual information while maintaining awareness of surrounding environment.

Display of information coincident with a viewer's changing gaze direction.

Display of information permitting a viewer to receive the information while changing her or his gaze direction.

Display of information coincident with a viewer's ongoing task.

These and other features and advantages of the present invention will become apparent from the following detailed description of illustrative embodiments thereof, which is to be read in connection with the accompanying drawings.

DETAILED DESCRIPTION

Augmented reality displays generally are provided either via handheld devices (e.g., cellular phone applications that superimpose simulated objects (simulacra) or information on images obtained via cellular phone cameras) or via head mounted displays (e.g., video goggles or glasses). Such displays typically present information at a fixed location relative to a frame of reference external to the viewer of the display, and move the information relative to the viewer as the display moves around. Typically, such displays do not respond to the viewer's eye movements, so that the viewer is constrained to gaze at the center of the display in order to apprehend the information presented via the display. Typical information presented via augmented reality displays includes simulacra such as video game characters, directional arrows, or informational icons, as well as textual information like labels indicating the names of various locations viewed through the displays.

As it becomes necessary for workers to digest increasingly complex information in diminishing time, researchers have investigated ways to make information more efficiently digestible. One approach to efficiently digesting information is speed reading, which can be accomplished in various ways. Some researchers have investigated a mode of electronically presenting information, known as Rapid Serial Visual Presentation (RSVP). A common variation of RSVP is to flash whole words at a fixed location on a blank background at a rapid pace (e.g., 300 to 500 words per minute). The advantage of this approach is that the reader does not waste time moving his or her eyes from word to word. Eye motion results in wasted time because during eye motion the reader's visual perception is interrupted so that she or he is not able to take in words. By staring at a fixed location, the reader is able to view sequential words without interruption by eye motion (other than blinking).

Another facet of the need to digest information in diminishing time is that workers may feel a need to multi-task, i.e. take in information while performing other tasks. One example of this is a navigation application that may display directional beacons on the screen of a cellular "smart" phone as a viewer directs the smart phone camera in different directions. Such an application displays the directional arrows at fixed locations relative to the viewer, i.e. as the user directs the camera toward or away from a recommended path the directional beacon may "move" off the screen of the smart phone to maintain a fixed orientation in space.

Figure 1:
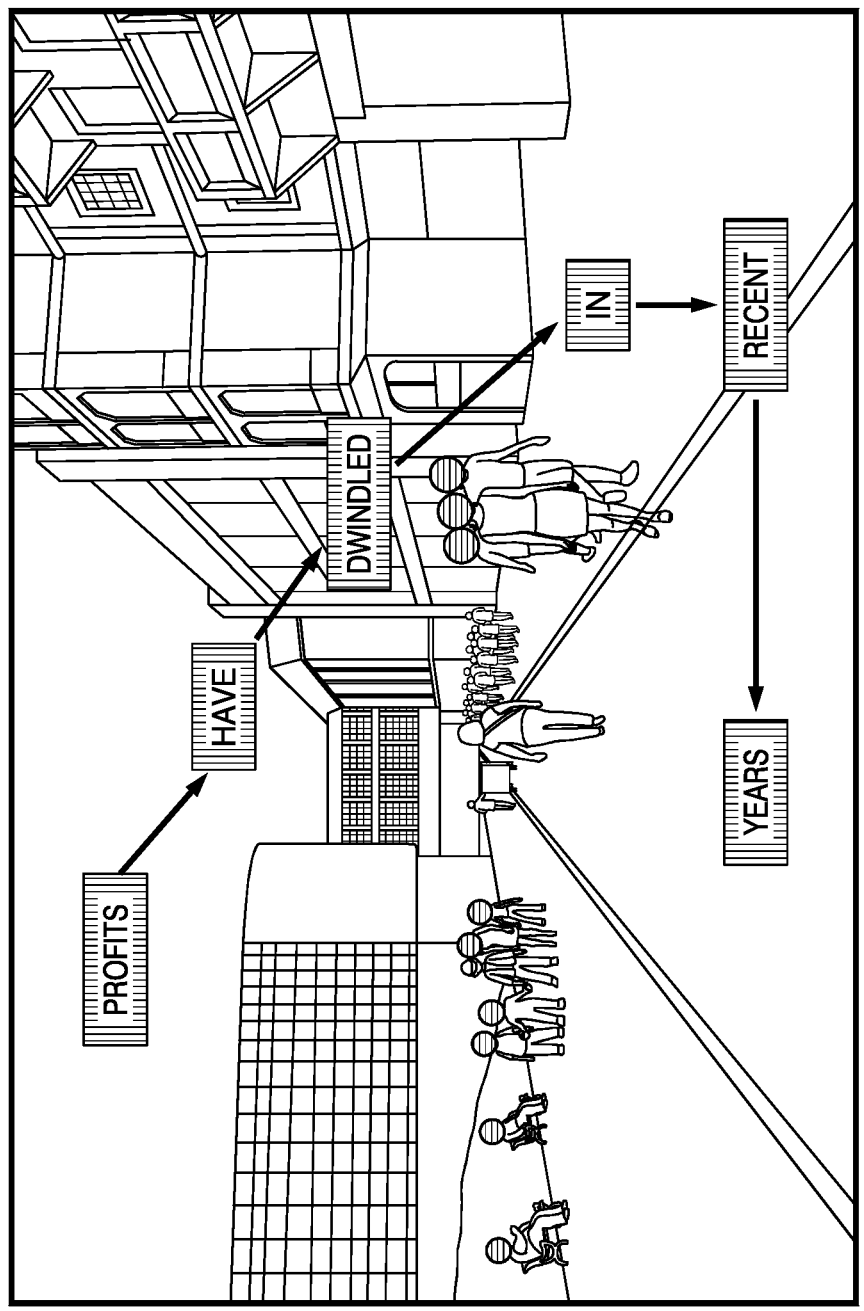
FIG. 1 depicts a first example of augmented reality speed reading.

As another example, shown in FIG. 1, a worker may wish to review a business communication while walking to work and observing a city environment (facial features are deliberately obfuscated). An aspect of the invention is that as the reader looks about the scene, an exemplary embodiment of the inventive system rapidly displays words or letters in sequential fashion wherever the reader looks. In other words, the fixed location that is a feature of RSVP moves around to match the reader's gaze direction as the reader looks at different parts of the scene. This is distinct from the typical presentation of information via augmented reality displays, in which the information remains in a fixed location relative to a frame of reference external to the viewer. This also is distinct from the typical presentation of text via RSVP, in which the text remains in a fixed location relative to the reader.

Figure 2:
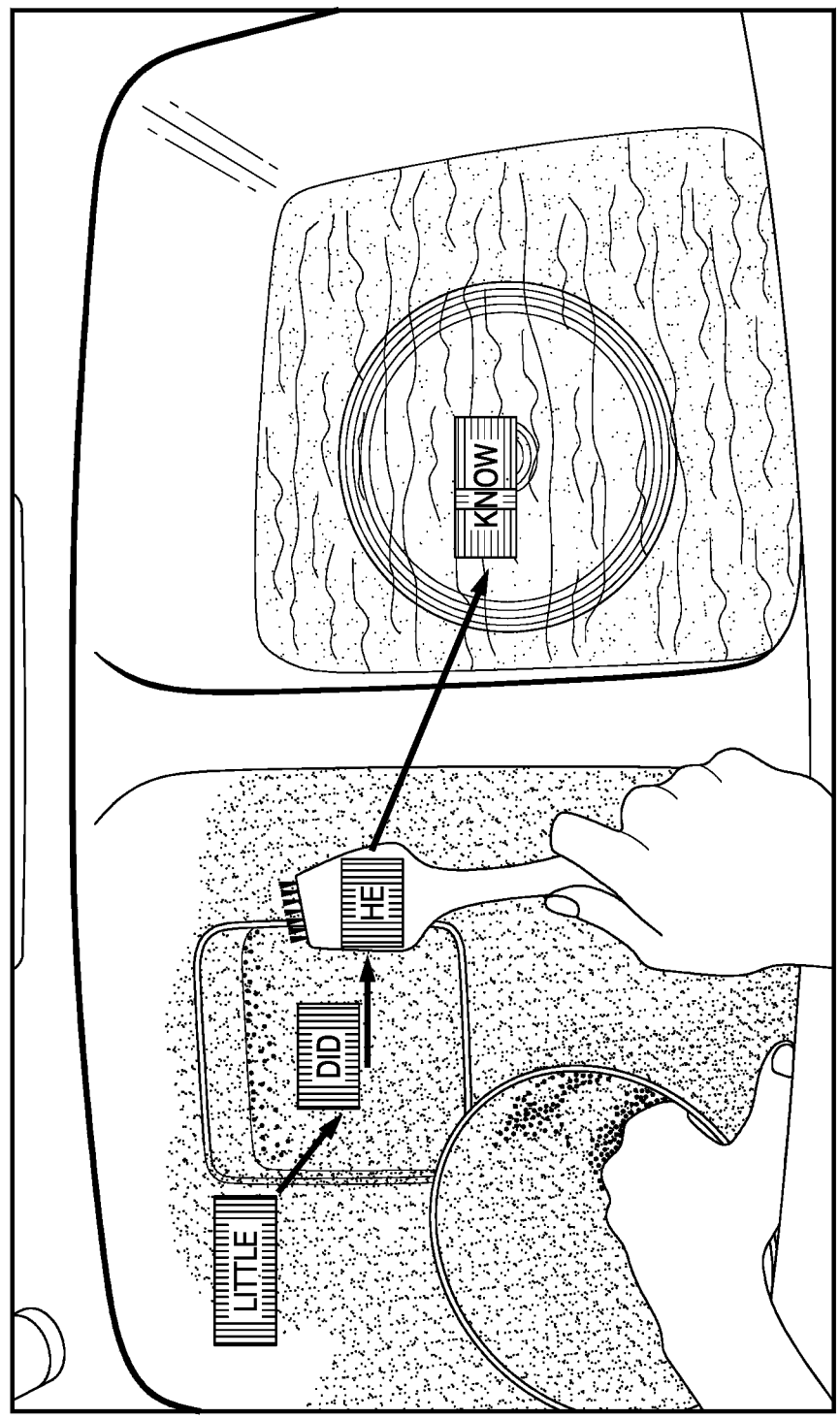
FIG. 2 depicts a second example of augmented reality speed reading.

FIG. 2 depicts another example of this aspect of the invention, in which a reader is performing the routine chore of washing dishes while simultaneously perusing a classic novel. Again, the location at which words are displayed moves around as the reader looks at different parts of the task.

Another aspect of the invention is that the sequential display of words is interrupted during saccade intervals as the reader moves his or her gaze from point to point. The words are displayed only between saccades, i.e. while the reader's attention and gaze are momentarily fixed on a particular gaze direction corresponding to an object of interest in the surrounding scene. This is distinct from the typical presentation of text via RSVP, which presumes that saccades will be eliminated by displaying the text in a fixed location relative to the reader. In one or more embodiments, the reader's gaze direction is detected by analyzing images of the reader's eye to detect the location of a light reflected from the reader's eye, while the beginning and end of a saccade are detected by monitoring torsional eye accelerations, i.e. by comparing time sequenced images of the reader's eye to detect changes in the location of the light reflected from the reader's eye. In one or more embodiments, at the beginning of the saccade, the sequential presentation of words is halted at a current word, and at the end of the saccade, the sequential presentation of words is started again from the current word at the new gaze direction. One or more embodiments also provide for the reader to signal that presentation of text should be initiated or halted, e.g., by repeated rapid blinking to interrupt the reflection of light from the reader's eye.

Figure 3:
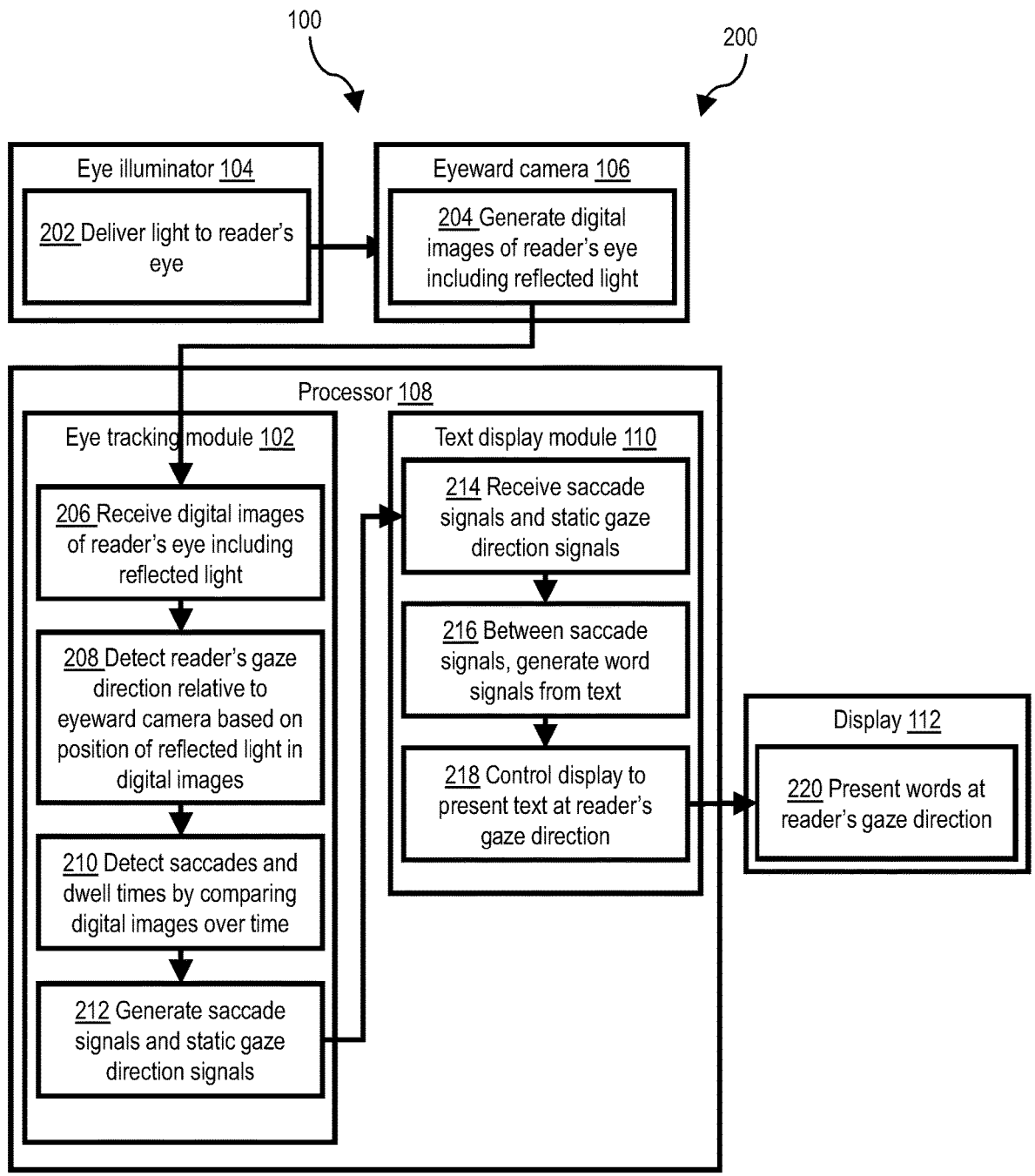
FIG. 3 depicts a system and method for augmented reality speed reading, according to an exemplary embodiment.

Accordingly, it will be understood that an exemplary system 100 and method 200 comprise certain components and function according to certain steps as depicted in FIG. 3. Generally, the components of the system 100 are disposed either in a head mounted unit (e.g., "smart" glasses or goggles) and/or in a worn unit such as a belt pack or cellular phone. The components of the system 100 generally are in communication with each other either by wired connection (e.g., USB®) or wirelessly (e.g., Bluetooth®). (Bluetooth is a trademark of the Bluetooth Special Interest Group. USB is a trademark of the USB Implementers Forum).

First of all, in order to display text where a reader is looking, without having any text lost while the reader's eyes are moving, the system 100 implements an eye tracking software module 102 to determine the reader's gaze direction and detect saccades. The eye tracking module 102 accomplishes these tasks in concert with an eye illuminator 104 and an eyeward camera 106. The eye tracking module 102 is implemented by a processor 108. Generally, the eye illuminator 104 and the eyeward camera 106 are disposed in a head mounted unit while the processor 108 is disposed either in the head mounted unit or in a worn unit. For example, the processor 108 can be a processor of a cellular phone.

At 202, the eye illuminator 104 delivers light to the reader's eye. The eye illuminator 104 may be, for example, an infrared light emitting diode (LED). It is helpful if the eye illuminator 104 provides light at a specific wavelength that the eyeward camera 106 is configured to preferentially detect. For example, in some embodiments having an infrared LED for the eye illuminator 102, the eyeward camera 106 includes an infrared charge coupled device (CCD). Then at 204 the eyeward camera 106 generates digital images of the reader's eye, including reflected light from the eye illuminator 104, with the reflected light from the eye illuminator 104 being clearly differentiated from reflections of the reader's environment.

At 206, the eye tracking module 102 receives the digital images of the reader's eye from the eyeward camera 106. At 208 the eye tracking module 102 detects the reader's gaze direction relative to the eyeward camera 106, based on the position of the reflected light in the digital images. For example, the eye tracking module 102 detects the reader's gaze direction based on relative locations of pupillary and corneal reflections in the digital images. At 210, the eye tracking module 102 detects saccades and dwell times (intervals of fixed gaze between saccades) by comparing digital images over time. For example, the eye tracking module 102 estimates torsional accelerations of the reader's eye by comparing the positions of the reflected light in sequential digital images. As another example, the eye tracking module 102 detects the beginning of a saccade by detecting changes in eye positions in a certain number of sequential digital images, e.g., at least three sequential images. The eye tracking module 102 then detects the end of a saccade and the beginning of a dwell time by detecting substantially constant eye position (e.g., within 1 degree) in a certain number of sequential digital images, e.g., at least three sequential images. In one or more embodiments, the eyeward camera 106 captures digital images at a frame rate of 60-120 per second. As a typical saccade takes about 200 milliseconds to initiate, and lasts for 20-200 milliseconds, this frame rate is sufficient to detect the beginning and end of a saccade. Thus, at 212 the eye tracking module 102 generates saccade signals and static gaze direction signals corresponding respectively to saccade intervals and dwell times.

Secondly, in order to display text where the reader is looking, the system 100 implements a text display module 110 (e.g. on processor 108) to control a display 112. At 214, the text display module 110 receives the saccade signals and the static gaze direction signals from the eye tracking module 102. At 216, between saccade signals (i.e. during dwell times corresponding to static gaze direction signals), the text display module 110 generates word signals from a text to be read (e.g., an e-mail or a business document). At 218, the text display module 110 controls the display 112, according to the word signals, to present words at the reader's gaze direction.

At 220, the display 112 presents the words at the reader's gaze direction. In one or more embodiments, the display 112 is a light emitting diode (LED) display as found in a head mounted display (HMD). In other embodiments, the display 112 is a solid state laser scanning on a transparent lens interposed between the reader's eye and the reader's environment, e.g., a lens as found in glasses or sunglasses. In other embodiments, the display 112 is a retinal scanning solid state laser.

Figure 4:
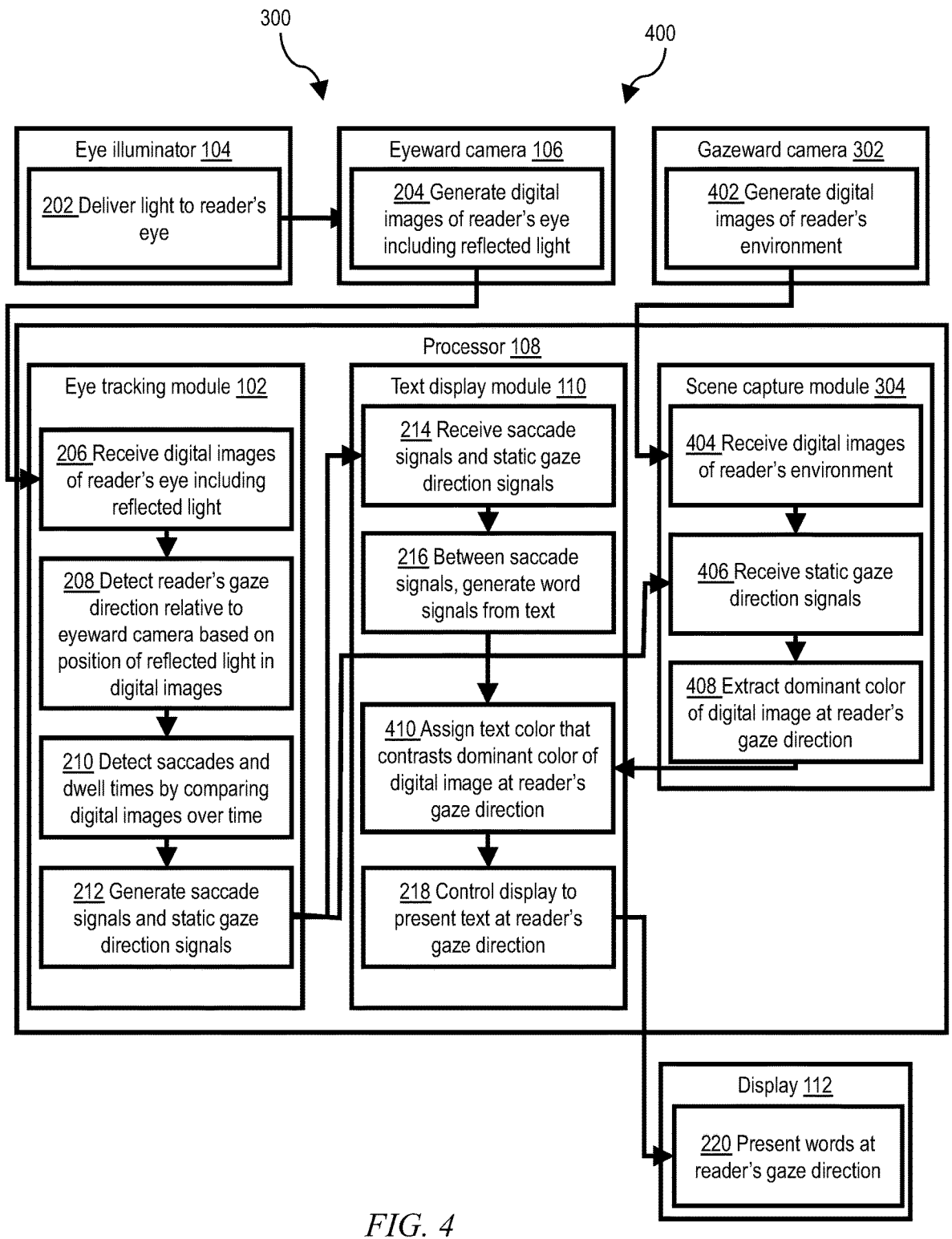
FIG. 4 depicts another system and method for augmented reality speed reading, according to another exemplary embodiment.

Referring back to FIGS. 1 and 2, it will be appreciated that as the reader's gaze travels about the surrounding scene, different colors will be encountered at different gaze directions. It will be further appreciated that although text generally can be superimposed over the scene and perceived without difficulty (for example, if the text is displayed by a retinal scanning laser or by a relatively bright laser reflecting from the lens of glasses), in some edge cases the text may be displayed in the same color as the scene at that particular gaze direction, and in such cases the text will be difficult to perceive. Accordingly, FIG. 4 depicts an exemplary system 300 and method 400 that correct the text display to account for background color of the surrounding scene, as shown for example in FIG. 2. In FIG. 4, components and steps corresponding to those of FIG. 3 are numbered alike and are not described in detail.

In addition to the components of the system 100, the system 300 as shown in FIG. 4 further includes a gazeward camera 302 that is focused on the scene that the reader views, and the processor 108 of the system 300 also implements a scene capture module 304.

At 402, the gazeward camera 302 generates digital images of the reader's environment, which the camera sends to the scene capture module 304.

At 404, the scene capture module 304 receives the digital images of the reader's environment. At 406, the scene capture module 304 receives the static gaze direction signals from the eye tracking module 102. At 408, the scene capture module 304 extracts the dominant color of each digital image at the reader's gaze direction, and sends the dominant color information to the text display module 110.

At 410, the text display module 110 assigns a text color that contrasts against the dominant color of each digital at the reader's gaze direction. The text display module 110 assigns the contrasting color based on, e.g., a CIELab color lookup table. Accordingly, at 218 the text display module 110 controls the display 112 to present words in a color that contrasts against the dominant color of the scene. It will be appreciated that in one or more embodiments, the display 112 will be a multi-color display, i.e. composed of multiple solid state lasers or LEDs of different colors, so as to provide for RGB color mixing.

Given the discussion thus far, and referring to the drawing Figures, it will be appreciated that, in general terms, an exemplary method, according to an aspect of the invention, includes (at 202-208) detecting a reader's changing gaze direction; (at 210) detecting movements of the reader's eye; and (at 216-220) between movements of the reader's eye, displaying text at the reader's gaze direction.

In one or more embodiments, detecting the reader's changing gaze direction includes (at 202) illuminating the reader's eye, (at 204) capturing a digital image of light reflected from the reader's eye, and (at 208) identifying pupillary and corneal reflections.

In one or more embodiments, detecting movements of the reader's eye includes (at 210) identifying torsional accelerations of the reader's eye by comparing time sequenced images of the reader's eye.

In one or more embodiments, displaying text at the reader's gaze direction includes (at 220) displaying entire single words centered on the reader's gaze direction. In one or more embodiments, displaying text at the reader's gaze direction includes (at 216) displaying a time sequence of words at the reader's gaze direction, interrupting the time sequence of words during movements of the reader's eye, and resuming the time sequence of words between movements of the reader's eye. In one or more embodiments, interrupting the time sequence of words includes identifying a current word at the beginning of a movement of the reader's eye, and resuming the time sequence of words includes displaying the current word after the end of the movement of the reader's eye.

In one or more embodiments, the exemplary method also includes (at 408) detecting a color of the reader's environment at the reader's gaze direction, and (at 410, 218) displaying the text in a color that contrasts against the color of the reader's environment.

In other aspects, an exemplary apparatus includes an eye illuminator 104 that delivers light to a reader's eye; an eyeward camera 106 that generates digital images of the reader's eye including reflected light from the eye illuminator; a display 112; and a processor 108 that is connected in communication with the eyeward camera and the display. The processor implements an eye tracking module 102 that receives the digital images from the eyeward camera and detects the reader's gaze direction, and the processor implements a text display module 110 that controls the display to present text at the reader's gaze direction.

In one or more embodiments, the eye illuminator 104 comprises an infrared light source. In one or more embodiments, the eyeward camera 106 comprises an infrared charge coupled device.

In one or more embodiments, the eye tracking module 102 detects the reader's gaze direction by detecting relative positions of pupillary and corneal reflections in the digital images received from the eyeward camera. In one or more embodiments, the eye tracking module detects saccades in which the reader's gaze direction changes, detects dwell times in which the reader's gaze direction does not change, and generates saccade and static gaze direction signals corresponding to the saccades and the dwell times.

In one or more embodiments, the text display module 110 receives the saccade and static gaze direction signals from the eye tracking module, generates word signals coinciding with the static gaze direction signals, and controls the display 112 according to the word signals to present text at the reader's gaze direction coinciding with the static gaze direction signals.

In one or more embodiments, the exemplary apparatus further includes a gazeward camera 302, connected in communication with the processor 108, that generates digital images of the reader's environment. The processor 108 implements a scene capture module 304 that receives the digital images of the reader's environment and extracts from the digital images a dominant color at the reader's gaze direction. The text display module 110 receives dominant color information from the scene capture module, assigns a text color that contrasts against the dominant color of the reader's environment at the reader's gaze direction, and controls the display to present the text in the text color.

Computer Program Products

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   detecting a reader's changing gaze direction;
   detecting a saccade of the reader's eye from a first gaze direction to a second gaze direction;
   before the saccade, displaying a first text at the first gaze direction; and
   after the saccade, displaying a second text at the second gaze direction,
   wherein a location at which text is displayed moves to match the reader's changing gaze direction.

2. The method of claim 1 wherein detecting the reader's changing gaze direction includes illuminating the reader's eye, capturing a digital image of light reflected from the reader's eye, and identifying pupillary and corneal reflections.

3. The method of claim 2 wherein detecting the saccade includes identifying torsional acceleration of the reader's eye by comparing time sequenced images of the reader's eye.

4. The method of claim 1 wherein the first text is the same as the second text.

5. The method of claim 1 wherein the first text is a time sequence of words, the second text is another time sequence of words, and the first text and the second text form a continuous sequence of words that is interrupted during the saccade and resumed after the saccade.

6. The method of claim 5 wherein interrupting the continuous sequence of words includes identifying a current word at the beginning of the saccade, and resuming the time sequence of words includes displaying the current word after the saccade.

7. The method of claim 1 further comprising detecting a color of the reader's environment at the reader's gaze direction and displaying the text in a color that contrasts against the color of the reader's environment.

8. An apparatus comprising:
   an eyeward camera that generates digital images of a reader's eye;
   a display; and
   a processor that is connected in communication with the eyeward camera and the display;
   wherein the processor implements an eye tracking module that receives the digital images from the eyeward camera and detects a saccade in which the reader's gaze changes from a first gaze direction to a second gaze direction,
   wherein the processor implements a text display module that controls the display to present text at the first gaze direction before the saccade and at the second gaze direction after the saccade,
   wherein a location at which text is displayed moves to match the reader's changing gaze direction.

9. The apparatus of claim 8 further comprising an eye illuminator that comprises an infrared light source.

10. The apparatus of claim 9 wherein the eyeward camera comprises an infrared charge coupled device.

11. The apparatus of claim 8 wherein the eye tracking module detects the reader's gaze direction by detecting relative positions of pupillary and corneal reflections in the digital images received from the eyeward camera.

12. The apparatus of claim 8 wherein the eye tracking module detects saccades in which the reader's gaze direction changes, detects dwell times in which the reader's gaze direction does not change, and generates saccade and static gaze direction signals corresponding to the saccades and the dwell times.

13. The apparatus of claim 12 wherein the text display module receives the saccade and static gaze direction signals from the eye tracking module, generates word signals coinciding with the static gaze direction signals, and controls the display according to the word signals to present text at the reader's gaze direction coinciding with the static gaze direction signals, wherein the text is a continuous time sequence of words that is interrupted during the saccade signals and continued during the static gaze direction signals.

14. The apparatus of claim 8 further comprising a gazeward camera, connected in communication with the processor, that generates digital images of the reader's environment, wherein the processor implements a scene capture module that receives the digital images of the reader's environment and extracts from the digital images a dominant color at the reader's gaze direction.

15. The apparatus of claim 14 wherein the text display module receives dominant color information from the scene capture module, assigns a text color that contrasts against the dominant color of the reader's environment at the reader's gaze direction, and controls the display to present the text in the text color.

16. A computer readable storage medium embodying computer readable program instructions which when executed by a computer cause the computer to facilitate a method of:
   detecting a reader's changing gaze direction;
   detecting a saccade of the reader's eye from a first gaze direction to a second gaze direction;
   before the saccade, displaying a first text at the first gaze direction; and
   after the saccade, displaying a second text at the second gaze direction,
   wherein a location at which text is displayed moves to match the reader's changing gaze direction.

17. The computer readable storage medium of claim 16 wherein detecting the reader's changing gaze direction includes illuminating the reader's eye, capturing a digital image of light reflected from the reader's eye, and identifying pupillary and corneal reflections.

18. The computer readable storage medium of claim 17 wherein detecting the saccade includes identifying torsional acceleration of the reader's eye by comparing time sequenced images of the reader's eye.

19. The computer readable storage medium of claim 16 wherein the first text is the same as the second text.

20. The computer readable storage medium of claim 16 wherein the first text is a time sequence of words, the second text is another time sequence of words, and the first text and the second text form a continuous sequence of words that is interrupted during the saccade and resumed after the saccade.

* * * * *